2,838,477

PROCESS FOR THE PURIFICATION OF HIGHLY POLYMERIZED HYDROCARBONS

Otto Roelen, Oberhausen-Holten, Helmut Kolling, Duisburg-Hamborn, Nikolaus Geiser, Oberhausen-Holten, and Ewald Stiebling, Oberhausen-Sterkrade, Germany, assignors to Ruhrchemie Aktiengesellschaft, Oberhausen-Holten, Germany, a corporation of Germany No Drawing. Application March 29, 1955
Serial No. 497,795

Claims priority, application Germany April 5, 1954

12 Claims. (Cl. 260—82)

It has already been suggested to produce polyethylene by polymerization of ethylene with polymerization stimulants which preferably contain organometallic compounds. Examples of polymerization stimulants which may be used are mixtures of titanium tetrachloride and aluminum alkyl compounds such as diethyl aluminum monochloride, or triethyl aluminum, or diisobutyl aluminum monochloride. Instead of titanium tetrachloride, other metal salts may be used, such as zirconium acetyl acetonate, or thorium acetyl acetonate. The polymerization is effected at relatively low pressures which are generally not in excess of 100 atmospheres and at temperatures of 20 to about 100° C. The reaction is generally effected in the presence of organic solvents in which the highly polymerized products are insoluble. Aliphatic hydrocarbons of the naphtha or diesel oil boiling range are preferably used as the solvents.

The reaction product obtained in granular or flocculant form is at first separated from the solvent by mechanical means, e. g. by filtration. However, after the mechanical separation there remain larger or smaller amounts of the solvent used in the polymerizate. Moreover, the polymerizates still contain residues of the catalyst used resulting in a certain ash content of the finished product. The amount of this ash content is dependent upon the type of the catalyst used, catalysts having a high content of titanium giving relatively high ash values. Prior to the further use of the polymerizates, both the remaining solvent portions and the residues of catalyst still present must be removed as completely as possible.

It has now been found that it is possible to purify the highly polymerized hydrocarbons from the solvents still present therein in a simple manner, by removing the residual solvent still adhering or absorbed after the mechanical removal of the bulk of the solvent by a treatment with steam. It can thus be easily accomplished to free the highly polymerized hydrocarbons from solvents almost completely. It was not to be expected that a treatment of this kind can be carried out with success because it must be effected within temperature ranges in which softening of the particular polymerizates usually occurs. However, it has surprisingly been found, that at temperatures of approximately 100° C. a satisfactory purification is possible without undesirable changes being suffered by the polymerization products.

The treatment with steam, in accordance with the invention, can be carried out at about 100° C. with saturated or superheated steam in single-stage or multistage operation. The material may be exposed to the action of the steam while being in the fixed or moved state. For example, the steam may stream through a bed of the polymerizates in downward direction. A horizontal or transverse flow of steam through the downwardly moving material may also be used. Finally, it is possible to blow the steam in upward direction in countercurrent to a downwardly moving layer of the polymerization products.

The solvents used in the polymerization are separated from the steam condensed after the treatment of the polymerizate. After sufficient purification and drying, the solvents may be returned into the process cycle of the polymerization.

The treatment with steam is expediently followed by a previously suggested treatment with mineral acid, in order to remove any residues of the catalyst used. This treatment may be effected, for example, with nitric acid. It has been found favorable to add small amounts of wetting agents to the mineral acid to obtain a sufficient wettability. Examples of wetting agents which may be used are sulfonates of fatty alcohols and alkyl aryl sulfonates. It is preferable to use 10% mineral acids, such as a 10% nitric acid, containing about 0.5–1% of alcohol sulfonates or alkyl aryl sulfonates. The treatment with mineral acids is preferably effected at somewhat elevated temperatures.

After the termination of the acid wash the polymerizate is freed from the acid by washing it with water which, if necessary or desired, may contain alkaline materials such as soda. After having sufficiently washed the material, it may be dried with air or other inert gases.

It is also possible to carry out the process with favorable results in such a manner as to mechanically separate the bulk of the solvent and then to free the polymerisate from the residues of solvent and catalyst still adhering by suspending the polymerizate in water prior to the treatment with steam. Thus, the mode of operation is practically such that the mass after being mechanically freed from the auxiliary liquid is suspended or stirred up in water. It is advantageous to repeat the extraction with water in the known manner by decantation, filtration, etc. In these cases, it has been found favorable to add small amounts of wetting agents, such as alcohol sulfonates or alkyl aryl sulfonates to the water. The product suspended in water and more or less extensively extracted is then de-oiled by passing steam into the suspension, thereby effecting a stream distillation of the auxiliary liquid. Following this, the suspension freed from the auxiliary liquid is separated in known manner by filtration and the polymerizate obtained is dried. This results, for example, in pulverous or granular polyalkylene materials which are practically free from auxiliary liquid and the ash contents of which amount to about 0.1–0.2% by weight, while the starting material showed ash contents of 0.3–0.4% by weight.

It is possible to obtain an improvement of the ash removal in a simple manner by operating in the manner described above, but adding alkalies, such as alkali carbonates or preferably alkali hydroxides, to the aqueous washing liquid. Very good washing effects have proved to be obtainable even with dilute alkaline solutions such as with solutions of sodium or potassium hydroxide having concentrations of less than 5% by weight based on the water used. Alkalies of higher concentration may also be used. Moreover, when using alkaline washing solutions, it may likewise be advantageous to add wetting agents, such as small amounts of alkyl aryl sulfonates, to the same.

Following the treatment with alkaline washing solutions, the suspension is separated into solid materials and washing liquid, and the residual alkali is removed from the moist solid material by repeated washing with water in the known manner. Finally, the mass is dried, preferably with the exclusion of air or oxygen. It is possible by means of this treatment with alkaline washing agents and the simultaneous steam distillation to obtain pulverous or granular polyalkylene which is practically free from auxiliary liquid and the ash content of which could be reduced from, for example, 0.3–0.4% in the starting material to 0.1–0.05% in the finished product.

The amount of the ash content of polymerization products caused by residues of catalyst is dependent, as already mentioned, upon the type of the catalyst used. If, for example, a mixture of 1 mol titanium tetrachloride and 10 mols aluminum-diethyl-monochloride is used as the catalyst, then products are obtained, the ash values of which can be reduced to about 0.06% by weight (see Example 2). If, in contrast to this, a mixture of 1 mol titanium tetrachloride and 1 mol aluminum-diethyl-monochloride, i. e. a catalyst having a higher titanium content is used, then the products treated in accordance with the invention still contain 0.1–0.15% by weight of ash.

In such cases, it is also possible to obtain a sufficient decrease in the ash content if, after mechanical separation of the bulk of the solvent, the residual portions of the solvent and of the catalyst are removed from the polymerization product by treating it simultaneously with water vapor and mineral acid and subsequently washing it with water. By this treatment, the last portions of the solvents are quantitatively driven off with the steam and, at the same time, the residual catalyst portions are brought into solution by the mineral acid and are removed partly with the effluent acid and partly in the subsequent water wash. By this mode of operation, even when using catalysts having a high titanium content such as a catalyst consisting of 1 mol titanium tetrachloride and 1 mol aluminum alkyl compound, the low ash values desired of about 0.06–0.09% by weight are obtained.

This mode of operation may be performed in various ways. For example, the polymerization product being treated, after mechanical separation of the bulk of the solvent, may be treated at about 100° C. in a stirring vessel or in a circulation apparatus in which the product is circulated together with aqueous mineral acid by means of a pump, it being expedient to separate from the resulting distillate the lower aqueous phase and to return the same to the reaction vessel, while the upper oily layer is withdrawn. In continuous operation, it may be desirable to effect the treatment in a worm or apparatus of similar construction in which the aqueous mineral acid heated to about 100° C. is admitted together with the polymerization product or introduced at several points into the polymerization product. The aqueous phase of the distillate is combined with the aqueous phase resulting at the end of the worm and may be recycled. Enrichment of the circulating acid with residual catalyst is avoided by withdrawing a part of the circulating mineral acid and making up this part with fresh mineral acid.

The concentrations of the aqueous mineral acids are preferably in the range of 5–15%. Examples of suitable mineral acids are nitric acid, sulfuric acid and hydrochloric acid. The quantitative proportion of polymerization product, after mechanical separation of the bulk of the solvent, to mineral acid may be varied within relatively wide limits as, for example, from about 1:4 to about 1:10. It may be of advantage to add small amounts of wetting agents to the mineral acids. Suitable wetting agents are alkyl aryl sulfonates, alcohol sulfonates, or the like. Small amounts of water-soluble alcohols, such as ethyl alcohol, may also be added for wetting.

Another mode of operation is to treat the polymerization product, after having the same mechanically freed from the bulk of the solvent, in a suitable apparatus such as in a vertical tube with steam which is passed through in downward direction and to admix to the steam gaseous compounds such as hydrogen chloride, sulfur trioxide, nitric oxides which, in connection with the steam, form mineral acids. It is also possible, however, to simultaneously contact the polymerization product being treated in any other suitable manner with mineral acid and water vapor. For example, the polymerization product, while being treated with steam, may be sprayed with dilute mineral acids or the product may be treated with a mixture of steam and acid vapors.

Very favorable results could also be obtained by effecting the treatment with steam under a reduced pressure and by simultaneously or subsequently treating the polymerizate with water, aqueous alkali hydroxides or mineral acids, to which wetting agents are added if necessary or desired. A subsequent final washing with water is required. In general, a reduction of the pressure to about 0.2 atmospheres absolute is sufficient. In practice, the operation is such that after mechanical separation of the bulk of the solvent a treatment with steam under a reduced pressure is effected. It is also possible, as already mentioned, to effect a treatment of the polymerizates with water, aqueous alkali hydroxides, or mineral acids, simultaneously with the treatment with steam under reduced pressure. The total treatment in this case is thus effected under reduced pressure.

The success of this mode of operation becomes evident, if, for example, a polymerization product of ethylene, in the production of which a mixture of 1 mol titanium tetrachloride and 1 mol diethyl-aluminum monochloride was used as the catalyst, is treated with steam, dilute nitric acid of about 60°, and water using in one case normal pressure in the treatment with steam and in a second case a pressure of 0.2 atmospheres absolute according to the invention. The ash content of the finished product when dried after the water wash is in the first case about 0.14% by weight as compared with only about 0.05% by weight in the second case.

Such low ash contents of 0.05% by weight are required if the polymerizates are to be applied for specific purposes in electrical engineering.

While in the following examples the process according to the invention will be described with reference to ethylene polymerization products, it should be understood that equally good results will be obtained when working with polymerization products of higher homologues of ethylene, for instance with those of propylene, butylene and so on.

*Example 1*

The polymerization was effected at temperatures of about 80° C. with the use of a naphtha fraction consisting of aliphatic hydrocarbons having a chain length of $C_{10}$ and freed from oxygen-containing compounds and with the use of a catalyst consisting of 1 mol titanium tetrachloride and 8 mols of aluminum-diethyl monochloride. After the separation of the bulk of the hydrocarbon fraction by filtration, the reaction product still contained 48% of solvent.

One kilogram of the separated granular material was treated for about 30 minutes with saturated steam at a temperature of 100° C. From the condensed steam an upper oily layer consisting of 478 grams of naphtha was separated.

The quantity of naphtha still present in the reaction product after the treatment with steam can be found by extracting the polymerizate with ethyl alcohol and subsequently subjecting it to filtration. If the filtrate is subsequently extensively diluted with water, then quite unimportant quantities of the naphtha used in the polymerization result. Thus, the polymerization product is practically completely freed from the naphtha by the treatment with steam.

After the treatment with steam, the reaction product was freed from the residual organometallic catalyst by treating it with 10 kilograms of an about 10% nitric acid, to which 0.5% of alcohol sulfonate of the molecular size $C_{12}$ had been added. The treatment with acid was effected for 4 hours at a temperature of 60–80° C. in a stirring vessel. Thereafter, the nitric acid was separated from the reaction product and the latter was freed from the acid by washing it with water.

The material, after being de-oiled and freed from

Example 2

The polymerization of ethylene effected in a naphtha fraction substantially consisting of aliphatic hydrocarbons of $C_9$–$C_{11}$ after the addition of a catalyst consisting of 10 mols diethyl-aluminum monochloride and 1 mol titanium tetrachloride resulted in a fine-grained reaction product. The bulk of the solvent was separated from the product by filtration. Thereafter, the reaction product still contained 65% of solvent. The ash content, based on solvent-free product, amounted to 0.33%.

One kilogram of the naphtha-containing mass, together with 10 kilograms of an about 2% potash solution to which 0.02% of alkyl aryl sulfonate of the molecular size $C_{12}$ had been added as wetting agent, was filled into a stirring vessel provided at the top with a cooler connected in the descending path and provided at the bottom with a drain cock. The mixture was then subjected to a distillation with steam while vigorously stirring. From the condensed water vapor an upper oily layer consisting of 6.5 kilograms of naphtha could be separated.

After the termination of the distillation with steam the potash solution was drained as far as possible from the stirring vessel and the remaining polyethylene was neutralized by washing with water.

After drying of the mass the same had an ash content of 0.06% by weight.

Example 3

The polymerization of ethylene was effected at temperatures of below 80° C. with the use of a fraction of saturated aliphatic hydrocarbons substantially consisting of $C_7$–$C_{10}$ freed from oxygen-containing compounds and with the use of a catalyst consisting of 1 mol titanium tetrachloride and 1 mol aluminum-diethyl monochloride. After the separation of the bulk of the hydrocarbon fraction by filtration the polymerizate had an ash content of 0.35% based on the dry mass. The product was freed from the residual hydrocarbons and the residual catalyst still adhering by treating it for about 4 hours in a stirring vessel with 7 times its quantity of 10% nitric acid to which 0.025% of alkyl aryl sulfonate had been added as wetting agent and which had been heated to about 100° C. Thereby the hydrocarbon and the water vapor distilled off from the stirring vessel and were condensed in a following cooler for total condensation. The aqueous distillate thereby obtained was continuously returned into the stirring vessel. The product was a fine-grained polymerizate which, after washing with water and drying, had a molecular weight of 70,000 and an ash content of 0.08% by weight.

Deviating from the mode of operation according to the invention, another part of the polymerizate freed from the bulk of the solvent by filtration was at first treated with steam of about 100° C. to remove the adhering residual solvent and subsequently treated for 4 hours at 60° C. in a stirring vessel with 7 times its quantity of a 10% nitric acid to which 0.025% of alkyl aryl sulfonate had been added as wetting agent. After washing with water and drying this product had an ash content of 0.14% by weight.

Example 4

A part of the polymerization product which had been prepared in the manner described in Example 3 was, after mechanical separation of the bulk of the solvent by filtration, freed from the residual solvent and catalyst still adhering by treating the polymerization product with steam of about 100° C. in a vertical tube which was closed at the bottom with a glass frit. During this treatment small amounts of gaseous hydrogen chloride were continuously added to the stream of steam. The treatment with steam was terminated after about 1 hour. After washing with water and drying the product had an ash content of 0.08%.

Example 5

The polymerization of ethylene was effected at temperatures of below 80° C. with the use of a fraction of saturated aliphatic hydrocarbons substantially consisting of $C_7$–$C_{11}$ freed from oxygenated compounds and with the use of a catalyst consisting of 1 mol titanium tetrachloride and 1 mol diethyl-aluminum monochloride. 100 grams of the polymerizate obtained after mechanical separation of the bulk of the hydrocarbon fraction by filtration was freed from the residues of the hydrocarbon fraction still adhering by a treatment at a pressure of about 0.2 atmospheres absolute and a temperature of about 60° C. in a stirring flask in the presence of 700 gms. of water. The hydrocarbons and the steam distilling off were condensed in a cooler. After about 1 hour, the separation of the hydrocarbon fraction was terminated.

A portion of the polymerizate thus treated was washed with water and dried. After drying, the sample had an ash content of 0.18% by weight.

Another part of the polymerizate treated with steam under reduced pressure was subsequently treated for 4 hours at 60° C. in a stirring vessel with 7 times its quantity of 10% nitric acid to which 0.025% of alkyl aryl sulfonate had been added as wetting agent. Then the polymerizate was washed with water and dried. The dried product had an ash content of 0.05% by weight.

If, deviating from this mode of operation, the removal of the last residues of the hydrocarbon fraction with steam was not effected under reduced pressure, but at normal pressure and a temperature of about 100° C. in the presence of water, the product thus treated and subsequently washed with water and dried had an ash content of 0.24% by weight.

A part of the polymerizate treated at 100° C. and normal pressure with steam was subsequently treated for 4 hours at 60° C. in a stirring vessel with about 7 times its quantity of a 10% nitric acid to which 0.025% of alkyl aryl sulfonate had been added as wetting agent. The polymerizate was then washed with water and dried. The dried product had an ash content of 0.14% by weight.

Example 6

The polymerization of ethylene was effected under the same conditions and with the same catalyst as described in Example 5. After mechanical separation of the bulk of the hydrocarbon fraction by filtration the polymerizate which still contained residues of hydrocarbon and catalyst was freed from these impurities by treating it with steam at a reduced pressure of about 0.2 atmospheres absolute and a temperature of about 60° C. in a stirring vessel in the presence of 5 times its quantity of 10% nitric acid, to which 0.025% of alkyl aryl sulfonate had been added as wetting agent. Thereby, the residual hydrocarbons and steam distilled off from the stirring vessel and were condensed in a subsequent cooler for total condensation. The aqueous distillate thereby obtained was continuously returned into the stirring vessel. After a treating time of about 3 hours the product was freed from acid by washing with water and dried. The dried finished product had an ash content of 0.04% by weight.

If, deviating from the mode of operation according to the invention, the treatment with 10% nitric acid in the stirring vessel was not effected under reduced pressure but at normal pressure and a temperature of about 100° C., the polymerizate, after being freed from acid by washing with water and dried, had an ash content of 0.09% by weight.

Example 7

The polymerization of ethylene was effected under the same conditions and with the same catalyst as described in Example 5. After mechanical separation of the bulk of the hydrocarbon fraction by filtration, the polymerizate was mixed in a stirring flask with about 7 times its quantity of water at a pressure of about 0.2 atmospheres absolute and heated for about 1 hour at about 60° C. Thereby, the last portions of the hydrocarbon fraction distilled off together with the steam and were condensed in a cooler. The remaining polymerizate was then treated for 4 hours at a temperature of about 60° C. with about 7 times its quantity of a 10% hydrochloric acid to which 0.025% of alkyl aryl sulfonate had been added as wetting agent. Following this, it was washed with water and dried. The dried product had an ash content of 0.04% by weight.

*Example 8*

A polymerization product which had been obtained in the manner described in Example 5 and from which the bulk of the hydrocarbon fraction had been separated by filtration was treated at a pressure of about 0.2 atmospheres absolute with steam of about 60° C. in a vertical glass tube which was closed at the bottom with a glass frit. During this treatment, small amounts of gaseous hydrogen chloride were continuously added to the stream of steam. After about 1 hour, the treatment was discontinued and the product was freed from acid by washing with water and dried. The dried polymerizate had an ash content of 0.05% by weight.

What we claim is:

1. In a process for the purification of highly polymerized olefins of the type comprising ethylene and its homologues in the presence of organic solvents and of catalysts consisting of a mixture of aluminium alkyl compounds with a compound selected from the group of titanium tetrachloride, zirconium acetyl-acetonate, and thorium acetyl acetonate at temperatures from 20–100° C. and pressures up to 100 atm., the steps comprising first mechanically separating the bulk of the solvent from the polymer product, suspending the polymerized mass in water to which an alkaline agent has been added, and thereafter subjecting the suspended polymer to a treatment with steam.

2. The process according to claim 1, in which alkali hydroxides in a quantity of less than 5% by weight of the water, are added to the water used for suspending.

3. The process according to claim 2, in which small amounts of wetting agents in addition to alkali are added to the water used for suspending.

4. The process according to claim 1, in which the water used for said suspending is renewed at least once prior to the beginning of the distillation with steam.

5. The process according to claim 1, in which the treatment with steam is effected with the addition of a mineral acid and the polymerization product thus treated is subsequently washed with water.

6. The process according to claim 5, in which the raw polymerization product is treated while stirring with aqueous mineral acid at about 100° C., whereby a distillate results containing an aqueous phase which is returned into the process, and an oily phase which is drawn off.

7. The process according to claim 5, wherein the mineral acid heated to a temperature of 100° C. is introduced together with the polymerization product into the purification stage, and the aqueous phase of the resulting distillate is recycled to the main process.

8. The process according to claim 5, wherein the mineral acid, heated to a temperature of 100° C. is introduced at several points into the polymerization product undergoing purification, and the aqueous phase of the resulting distillate is recycled into the main process.

9. The process according to claim 5, in which the polymerization product is treated with steam, to which is added a gaseous compound selected from the group consisting of hydrogen chloride, sulfur trioxide, and nitric oxides, which form mineral acids in combination with the steam.

10. The process according to claim 5, in which the polymerization product is sprayed with dilute mineral acids during the treatment with steam.

11. The process according to claim 5, in which the polymerization product is treated with a mixture of steam and acid vapors.

12. The process according to claim 1, in which the treatment with steam is effected under a reduced pressure.

References Cited in the file of this patent

UNITED STATES PATENTS

| | | |
|---|---|---|
| 2,650,912 | Hutchinson | Sept. 1, 1953 |
| 2,710,854 | Seelig | June 14, 1955 |
| 2,713,043 | Daumiller | July 12, 1955 |
| 2,721,189 | Anderson | Oct. 18, 1955 |